US007001053B1

(12) United States Patent
Chieh et al.

(10) Patent No.: US 7,001,053 B1
(45) Date of Patent: Feb. 21, 2006

(54) ROTARY MOTION POWERED LIGHT EMITTING DIODES

(76) Inventors: Peter T. C. Chieh, 18424 Mt. Langley St., Fountain Valley, CA (US) 92708; Zhen Qiu Huang, 18424 Mt. Langley St., Fountain Valley, CA (US) 92708

( * ) Notice: Subject to any disclaimer, the term of this patent is extended or adjusted under 35 U.S.C. 154(b) by 225 days.

(21) Appl. No.: 10/694,227

(22) Filed: Oct. 28, 2003

(51) Int. Cl.
*B60Q 1/32* (2006.01)
*B60Q 1/26* (2006.01)
*H02K 11/00* (2006.01)

(52) U.S. Cl. ....................... 362/500; 362/192; 362/800

(58) Field of Classification Search ................ 362/500, 362/192, 800, 487, 478; 315/76
See application file for complete search history.

(56) References Cited

U.S. PATENT DOCUMENTS 4,648,610 A * 3/1987 Hegyi ..................... 280/11.19
4,775,919 A * 10/1988 Pearsall et al. ............. 362/500
5,015,918 A * 5/1991 Copeland ..................... 315/76
5,016,144 A * 5/1991 DiMaggio .................... 362/35
5,584,561 A * 12/1996 Lahos ........................ 362/473
6,116,763 A * 9/2000 King .......................... 362/500
6,565,243 B1 * 5/2003 Cheung ...................... 362/500

* cited by examiner

*Primary Examiner*—Thomas M. Sember
*Assistant Examiner*—James W Cranson, Jr.
(74) *Attorney, Agent, or Firm*—Albert O. Cota

(57) ABSTRACT

A rotary motion powered system for energizing light emitting diodes is taught that utilizes a permanent magnet generator (20) located within a vehicle wheel (64) for producing the requisite electric power. The generator consists of two main elements: a rotating portion (26) and a stationary portion (28). The rotating portion utilizes a base (30) that is attached directly to an adapter base (72) attached to the vehicle wheel, and the stationary portion includes a counter weight (62), thus permitting this portion to remain horizontal when the wheel is rotating. An ac/dc bridge rectifier (22) is in electrical communication with the generator output to change the alternating current produced by the permanent magnet generator to direct current. A number of light emitting diodes are disposed within a vehicle wheel member and are powered by the direct current power, thereby producing an unusual and unique visual effect when the wheel is rotating.

20 Claims, 9 Drawing Sheets

ROTARY MOTION POWERED LIGHT EMITTING DIODES

TECHNICAL FIELD

The present invention pertains to decorative lights for motor vehicles in general, and more specifically, to a plurality of light emitting diodes that spin within the center of an automotive wheel, or wheel cover, with the light emitting diodes electrically energized by wheel rotation.

BACKGROUND ART

Previously, many types of lights have been used in conjunction with vehicle wheels in endeavoring to provide a pleasing and unique visual effect. In most cases the illumination is provided by light emitting diodes (LED's) powered by conventional storage batteries.

The prior art listed below did not disclose patents that possess the novelty of the instant invention; however the following U.S. patents are considered related:

| U.S. Pat. No. | Inventor | Issue Date |
|---|---|---|
| 4,381,537 | Hinrichs | Apr. 25, 1983 |
| 4,562,516 | Chastain | Dec. 31, 1985 |
| 4,763,230 | Cummings et at. | Aug. 9, 1988 |
| 4,800,469 | Leon | Jan. 24, 1989 |
| 4,847,735 | Kawasaki | Jul. 11, 1989 |

Hinrichs in U.S. Pat. No. 4,381,537 teaches an automotive accessory consisting of a translucent disk wheel cover that overlays a supporting plate mounted on an axle. The plate includes individual lamps that are turned on and off in a desired sequence to provide an illusion of movement such as spokes of a wheel.

Chastan in U.S. Pat. No. 4,562,516 discloses an illuminating spinner attached to an automobile wheel having its center hub cap removed. The spinner has a plurality of wings with apertures located in front walls and a central front opening covered by a cap. An adjustable adapter locks the spinner on the wheel, and electrical LED circuitry inside the spinner provides illumination.

Cummings et al in U.S. Pat. No. 4,763,230 teaches a plurality of lights forming a string that is connected to an electrical power source. The string is interleaved between the spokes of a wheel.

U.S. Pat. No. 4,800,469 issued to Leon is for a safety warning light that is mounted on a valve stem on a wheel. The apparatus has a two-part housing with a LED on one side and a battery on the other, with a switch for control.

Kawasaki in U.S. Pat. No. 4,847,735 discloses a safety lamp for a bicycle or motorcycle. The lamp has a male thread for attachment to the air valve of the bicycle's or motorcycle's wheel.

For background purposes and as indicative of the art to which the invention is related reference may be made to the remaining cited design Pat. No. Des. 332,441 issued to Douglas, Jr.

DISCLOSURE OF THE INVENTION

Automotive wheels have been a focal point for styling a motor driven vehicle for decades using after-market components. Tires have been subjected to many changes, from different sizes both larger and smaller, white walls, wider tread, etc. Further, the wheel's structure has been replaced with cast metallic types and wheel coverings have been produced in a wide variety of sizes, shapes and ornamentations. Lighting has also been produced to back-light the wheels, and attempts have been made to include lights preferably in the form of LEDs, due to their low power consumption and extended life expectancy. It may be seen from the prior art that many types of illumination have been developed in conjunction with a vehicle wheel to enhance the wheel's appearance. The biggest problem with the use of LEDs is that a portable power source is required, which is obviously a conventional storage battery. While this approach is acceptable regarding its operational capabilities, the problem of replacement rises as batteries have a limited life and must be changed when they have exhausted their power reservoir.

Therefore, the primary object of the invention is to overcome the use of batteries and to utilize an alterative power source that does not require replacement. This object is realized by using a permanent magnet generator that is small enough to fit inside an automotive wheel center cap or spinner and remain in place without maintenance for the life of the vehicle.

An important and novel object of the invention is that the generator utilizes the rotation of the wheel to achieve its power producing capabilities. This unique feature is accomplished by using a rotating portion of the generator fixed to the wheel and a stationary portion freewheeling using a counter-weight to maintain its relative motionless position. The generator will produce power any time the vehicle wheel is rotating and therefore does not require switches or controls to de-energize the power when the vehicle is not in use.

Another object of the invention is that the permanent magnet generator is completely waterproof and robust enough to withstand the shock and vibration that results from being located within an automotive wheel center cap or spinner.

Still another object of the invention is that the generator is almost entirely fabricated of injection-molded components, with the exception of the axle bearings, magnet ring and armature including coil windings. It is possible to use powered ferrous metal in the thermoplastic when magnetism is required for electrical production.

Yet another object of the invention is realized using injection-molded components which permits the cost to the public to be well within the reach of all and further large production quantities may allow additional cost reduction.

A further object of the invention is that the LEDs may be positioned at almost any location within the wheel cap since it is rotating with the stationary portion of the generator. This positioning permits an unlimited array of lights, colors and reflections.

Another object of the invention is that a translucent or transparent cap, again made of thermoplastic, may be used in conjunction with the LED's. As an example, an emblem, figure, icon, scene, design or even a reflective surface may be incorporated into the cap with any combination of light colors.

A final object of the invention is that the LED's may be mounted into wheel covers, on the spokes of a spoked wheel, on alloy wheels and even on the blade of a wheel spinner cover.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
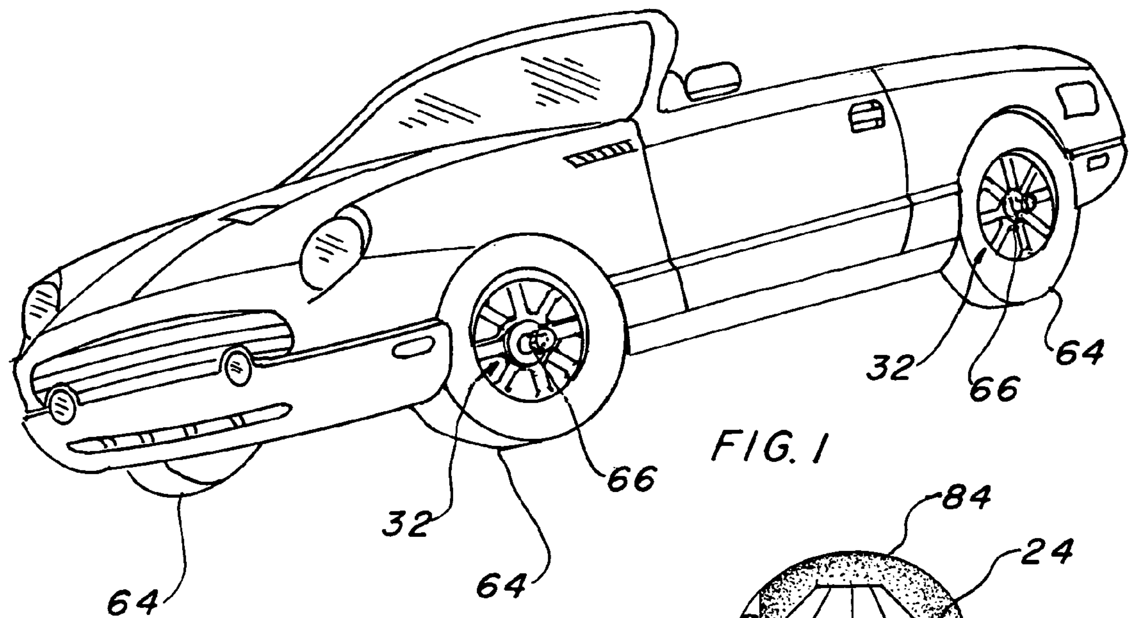
FIG. 1 is a partial isometric view of the preferred embodiment installed in the wheel of a typical automobile.
Figure 2:
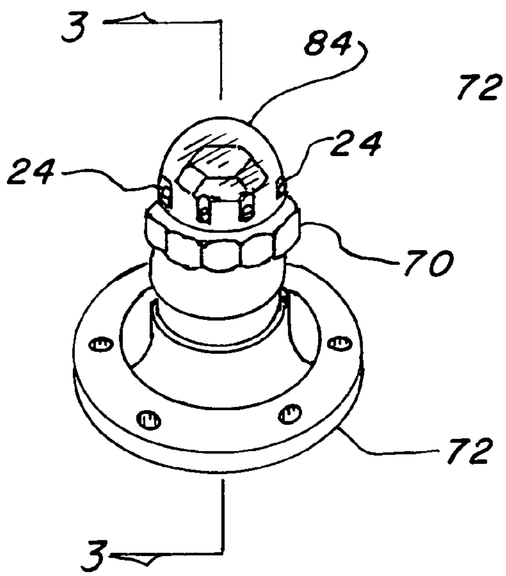
FIG. 2 is a partial isometric view of a hexagonal nut knockoff and adapter enclosing the preferred embodiment of the invention.

The best mode for carrying out the rotary motion powered light emitting diodes is presented in terms of a preferred embodiment with variations in locations of the light emitting diodes. The preferred embodiment, as shown in FIGS. 1 through 46, is comprised of three basic assemblies: a permanent magnet generator 20 to provide power, a bridge rectifier 22 to change the power from ac to dc, and a plurality of light emitting diodes, hereafter designated LEDs 24, to illuminate a pattern on a vehicle wheel.

The permanent magnet generator 20 is completely self-contained and is mounted inside an adapter within a vehicle wheel and produces electric power whenever the wheel is rotating. The generator 20 has two main elements: a rotating portion 26 and a stationary portion 28, as illustrated best in FIG. 6. The rotating portion 26 utilizes a base 30, shown alone in FIGS. 7 and 8, and includes means for attaching the base 30 to a vehicle wheel center 32 in the form of a plurality of legs 34 that are integrally formed on the top of the base 30. For descriptive purposes, the base 30 has an inner surface and an outer surface, with a pair of connectors 36 penetrating the wall of the base in a sealed manner for electrically communicating the output power from the generator 20 while still providing a hermetic seal that protects the internal components of the generator from the elements.

Figure 5:
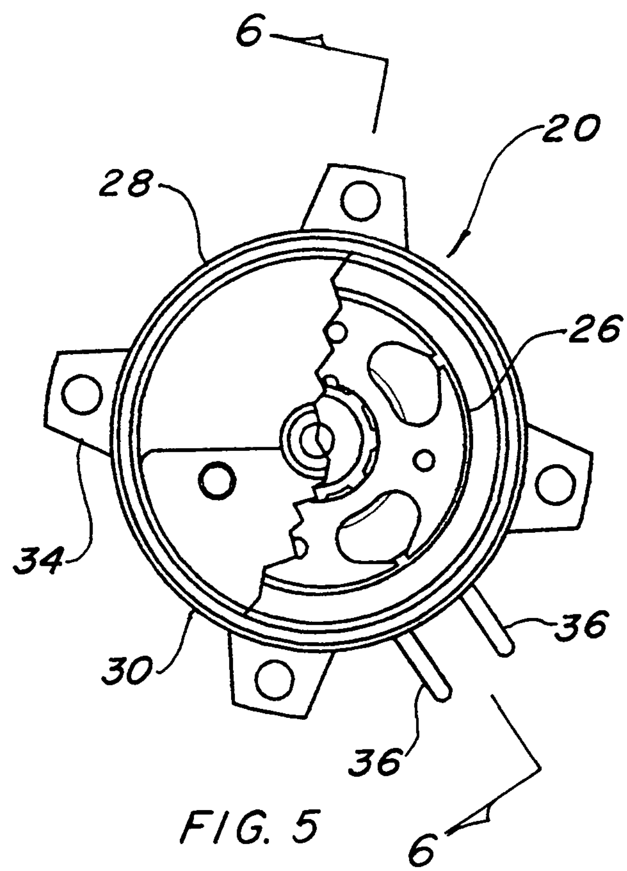
FIG. 5 is a cutaway plan view of the permanent magnet generator in the preferred embodiment.
Figure 6:
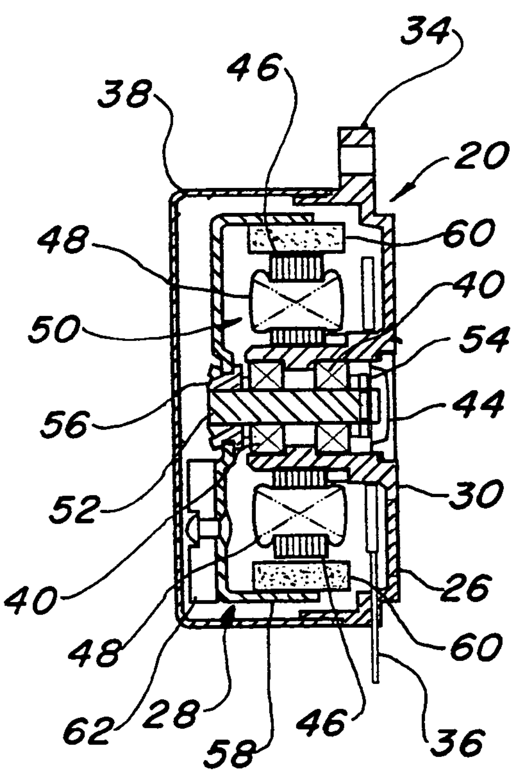
FIG. 6 is a cross sectional view taken along lines 6—6 of FIG. 5.
Figure 7:
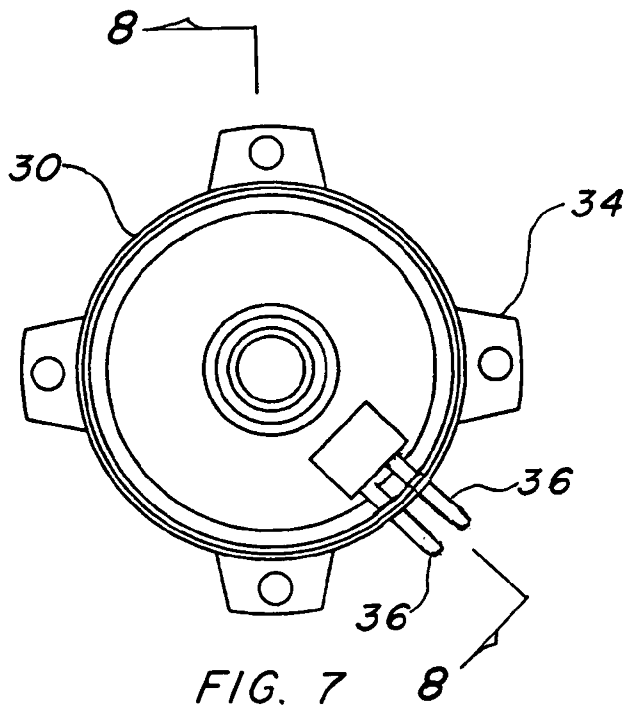
FIG. 7 is a plan view of the base of the permanent magnet generator in the preferred embodiment, shown by itself for clarity.
Figure 8:
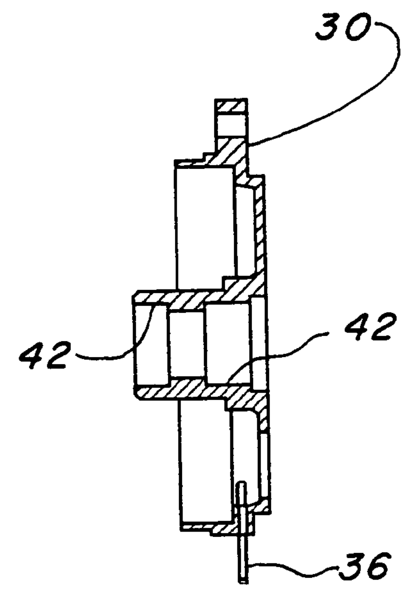
FIG. 8 is a cross sectional view taken along lines 8—8 of FIG. 7.
Figure 9:
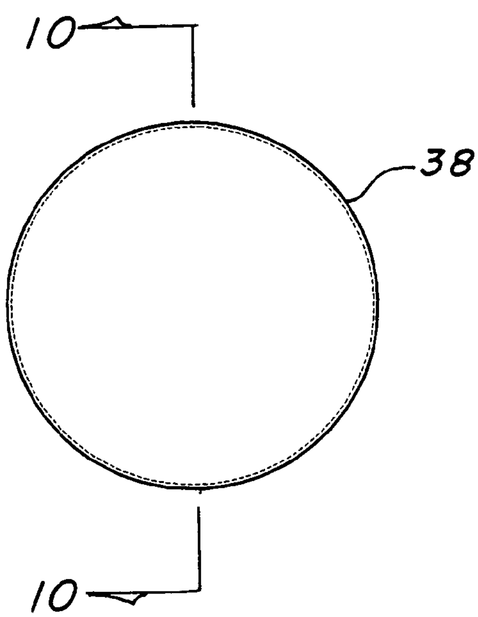
FIG. 9 is a plan view of the case of the permanent magnet generator in the preferred embodiment, shown by itself for clarity.
Figure 10:
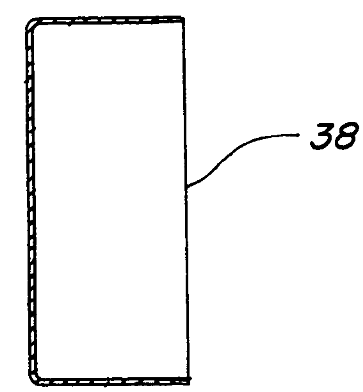
FIG. 10 is a cross sectional view taken along lines 10—10 of FIG. 9.
Figure 11:
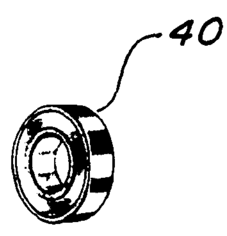
FIG. 11 is a partial isometric view of the first axle bearing, shown by itself for clarity.
Figure 12:
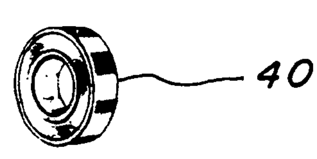
FIG. 12 is a partial isometric view of the second axle bearing, shown by itself for clarity.

A case 38 surrounds the outer surface of the base 30, as illustrated in FIGS. 5 and 6 assembled, and by itself in FIGS. 9 and 10. The case 38 has thin walls and is formed in a cup-like shape having a flat top and straight side walls which protect the internal components within the generator 20.

A pair of axle bearings 40 are pressed into the base 30 at spaced intervals into a set of race cavities 42, one from the outside and the other from the inside. The bearings 40 are the sealed ball bearing type, which are well known in the art and in common usage. The bearings 40 are shown assembled in FIG. 6, and by themselves in FIGS. 11 and 12.

Figure 13:
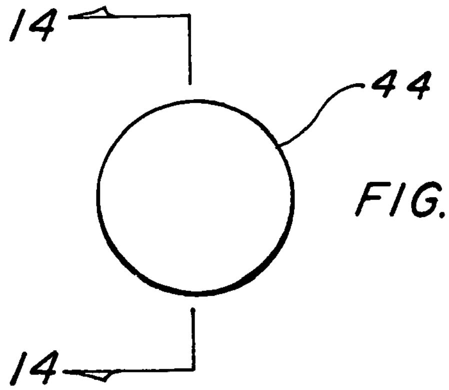
FIG. 13 is a plan view of the axle cover of the permanent magnet generator in the preferred embodiment, shown by itself for clarity.
Figure 14:
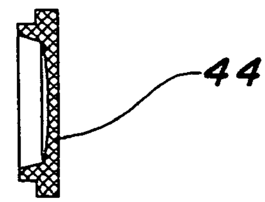
FIG. 14 is a cross sectional view taken along lines 14—14 of FIG. 13.
Figure 15:
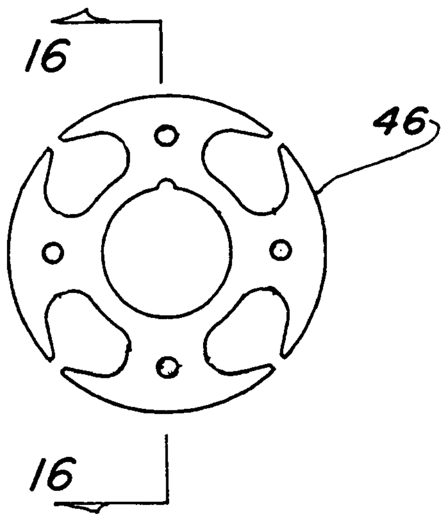
FIG. 15 is a plan view of one of the armature laminations of the permanent magnet generator in the preferred embodiment, shown by itself for clarity.
Figure 16:
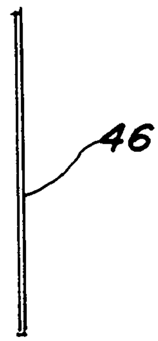
FIG. 16 is a cross sectional view taken along lines 16—16 of FIG. 15.
Figure 17:
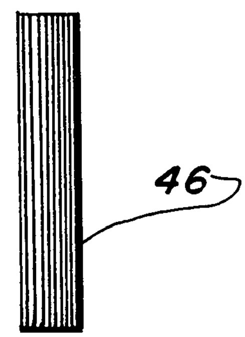
FIG. 17 is an arbitrary cross sectional view of a stack of armature laminations used in the preferred embodiment, shown by itself for clarity.

An axle cover 44 is positioned on the inner surface of the base 30 to cover the appropriate axle bearing 40, as illustrated in FIGS. 13 and 14. The cover 44 fits tightly into a recess in the base 30 and is flush with the inner surface of the base 30.

Figure 18:
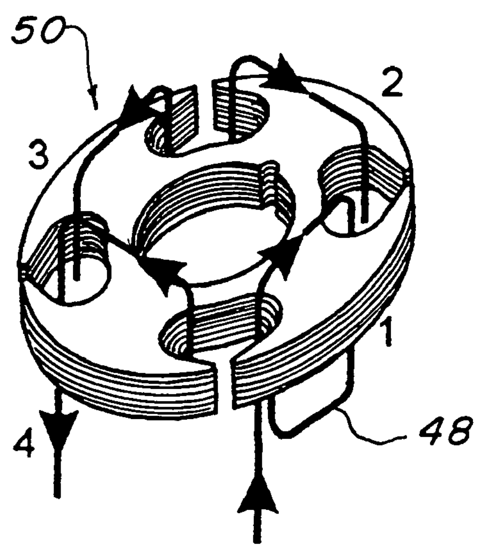
FIG. 18 is an isometric view of the stack of armature laminations with the armature coil windings, shown with arrows as to their winding orientation.
Figure 19:
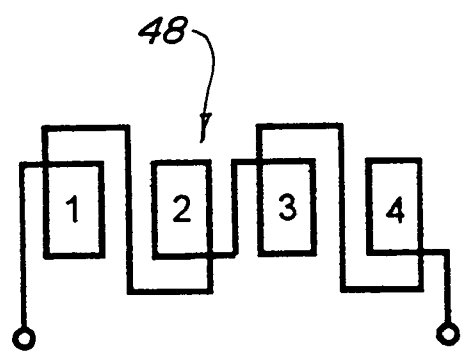
FIG. 19 is a schematic illustrating the armature coil windings with numbers corresponding to the numbers depicted in FIG. 18.
Figure 20:
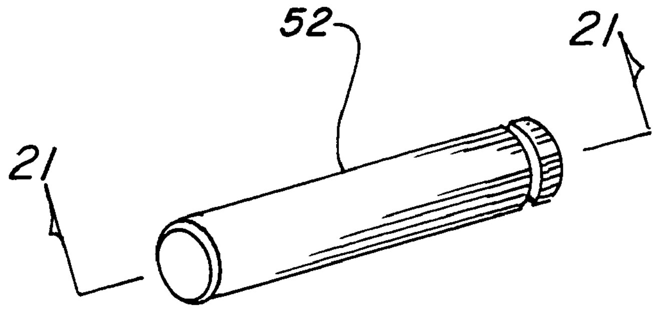
FIG. 20 is an isometric view of the axle of the permanent magnet generator in the preferred embodiment, shown by itself for clarity.
Figure 21:
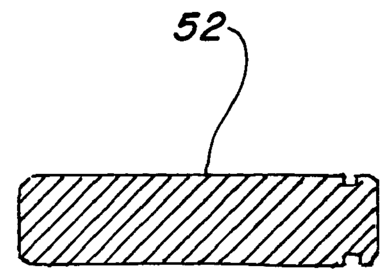
FIG. 21 is a cross sectional view taken along lines 21—21 of FIG. 20.
Figure 22:
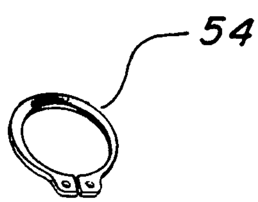
FIG. 22 is an isometric view of the snap ring for the axle of the permanent magnet generator in the preferred embodiment, shown by itself for clarity.
Figure 23:
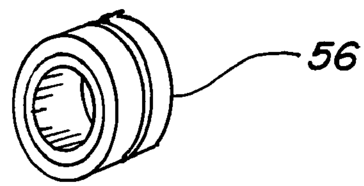
FIG. 23 is an isometric view of the tightening ring for the axle and magnet ring frame in the preferred embodiment, shown by itself for clarity.
Figure 24:
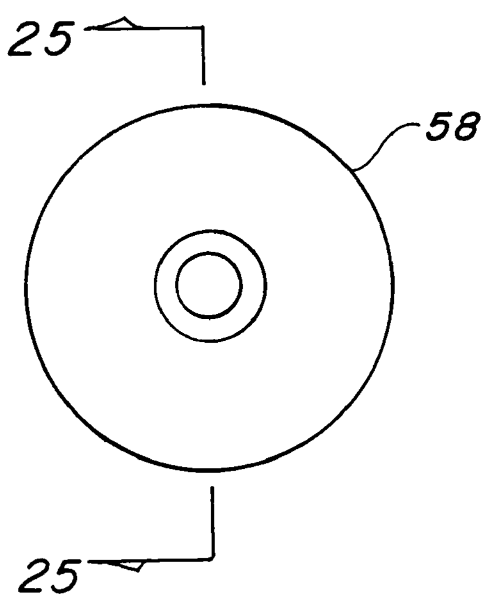
FIG. 24 is an isometric view of the magnet ring frame of the permanent magnet generator in the preferred embodiment, shown by itself for clarity.
Figure 25:
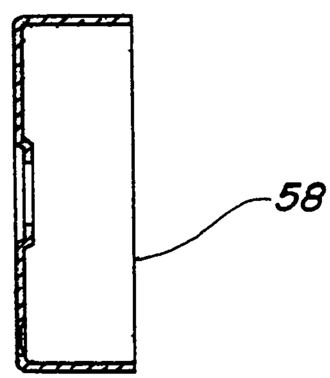
FIG. 25 is a cross sectional view taken along lines 25—25 of FIG. 24.
Figure 26:
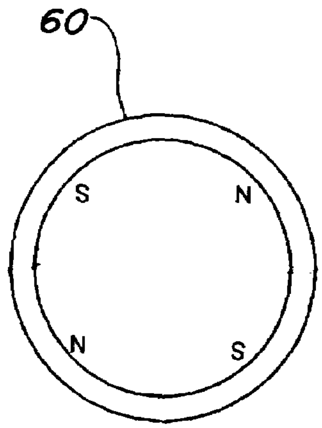
FIG. 26 is a plan view of the magnet ring of the permanent magnet generator in the preferred embodiment, with the magnetic polarity indicated with alpha symbols.
Figure 27:
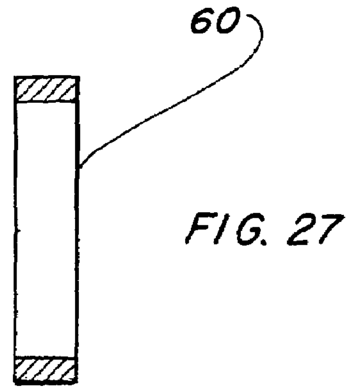
FIG. 27 is a cross sectional view taken along lines 27—27 of FIG. 26.
Figure 28:
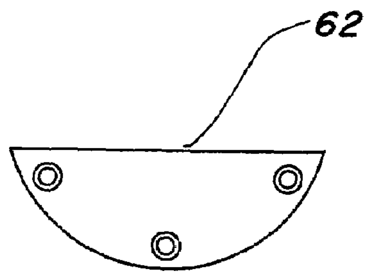
FIG. 28 is an isometric view of the counter weight of the permanent magnet generator in the preferred embodiment, shown by itself for clarity.
Figure 29:
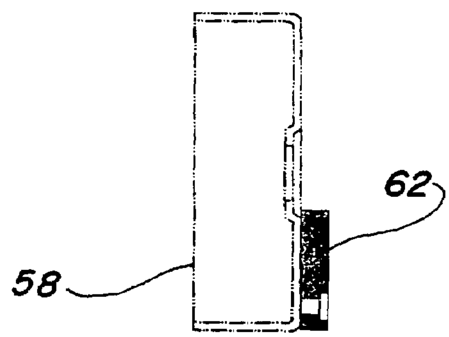
FIG. 29 is a cross sectional view taken along lines 29—29 of FIG. 28 illustrating the counter-weight installed on the case shown in phantom.
Figure 30:
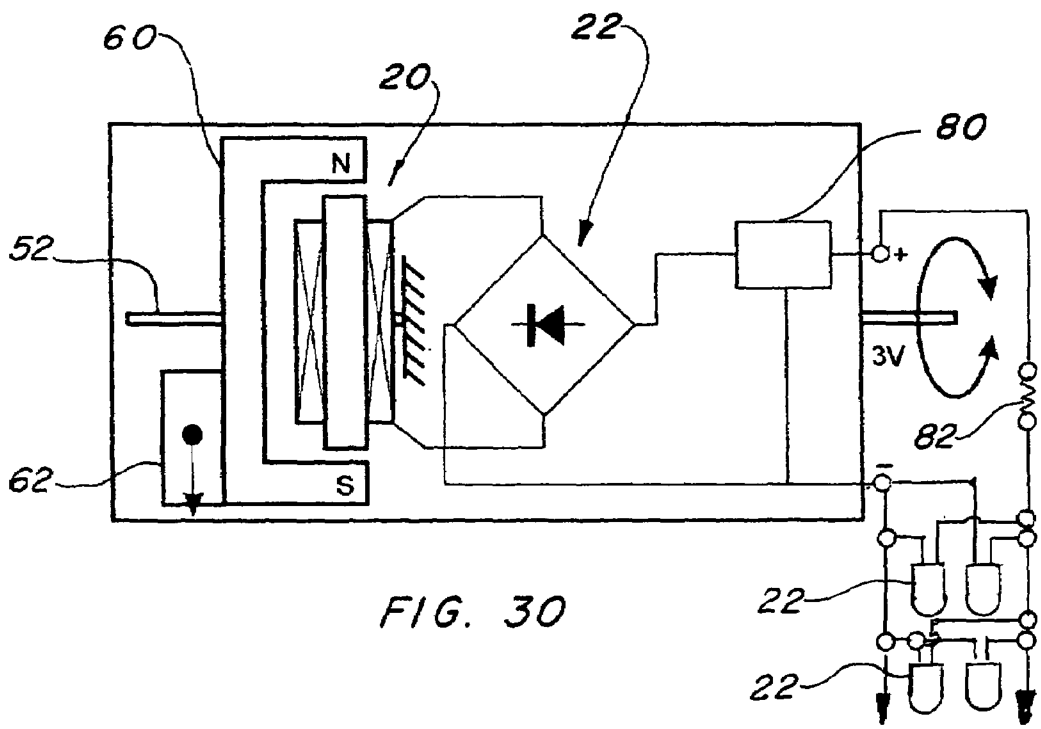
FIG. 30 is a schematic diagram of the generator and the bridge rectifier along with the optional voltage regulator.

A plurality of armature laminations 46, wound with armature coil windings 48, intimately engage the base 30 by pressing into the base on a portion directly outside of the bearings 40, as depicted in FIG. 6. The armature laminations 46 are shown alone in FIGS. 15 and 16, and stacked together in FIGS. 17 and 18. The laminations 46 may be made of ferrous metal or injection-molded in thermoplastic and have powered iron included in the material to utilize magnetism phenomenon in the functional operation of the generator 20. The windings 48 consist of copper wire that is wound into the recesses in the lamination stack, as shown in FIG. 18, with the schematic of the route depicted in FIG. 19 showing the corresponding recesses by numbers between the two drawings. An electromagnetic field is created by the rotation of the wound armature 50 when it is rotated inside a permanent magnet as described later with electrical power produced through the winding wire.

The stationary portion of the permanent magnet generator consists of an axle 52 that has a snap ring 54 on one end, with the axle 52 pressed into the inner races of the bearings 40, as illustrated in FIG. 6. The end of the axle 52 opposite the snap ring 54 engages a tightening ring 56 that intimately grips the axle 52, thereby holding the axle 52 in place between the bearings 40.

The tightening ring 56 also grips a magnet ring frame 58 on its peripheral surface, interfacing in such a manner as to attach the frame 58 securely, thus permitting the frame 58 to rotate with the axle 52. The magnet ring frame 58 is sized to be entirely within the case 38 and to rotate freely with the stationary portion 28 of the generator 20.

A permanent magnet ring 60 is attached to the magnet ring frame 58 and is positioned over the wound armature 50, thereby leaving an air gap therebetween. The magnet ring 60 is magnetized with a plurality of opposed polarity poles at equal spaced intervals. With this arrangement the permanent magnet generator 20 produces alternating current power when the rotating portion 26 and stationary portion 28 are in motion relative to each other.

The key to the invention is the use of a revolving means to rotate the permanent magnet generator 20 to supply alternating current electrical power. In order to obtain a differential between the rotating portion 26 and the stationary portion 28 of the generator 20 a counter weight 62 is affixed to the magnet ring frame 58 on the generator's stationary portion 28. This counter weight 62 creates the required differential rotation of the permanent magnet generator when a vehicle wheel is turning the rotating portion 26, as gravity holds the weight 62 on the bottom of the stationary portion 28. The counter weight 62 is shown alone in FIGS. 28 and 29, with 29 illustrating the weight 62 attached to the frame 58 shown in phantom. FIGS. 5 and 6 show the weight 62 at the bottom of the stationary portion 28 as held by gravity, as the two portions are free to rotate independently.

The permanent magnet generator 20 utilizes a metallic construction material for the bearings 40, the magnet ring 60 and armature 50 including the armature windings 48, and thermoplastic for the remainder of the generator. It should be noted that powered ferrous metal may be used in conjunction with the plastic in order to obtain the proper characteristics, and the windings are preferably made of copper wire. Additionally any electrical interconnections between the generator 20 and the LED's 24 may be accomplished using conventional insulated copper wire, or the like.

Figure 31:
FIG. 31 is an arbitrary cross sectional view of the adapter plate used in conjunction with the knockoff and adapter, shown by itself for clarity.
Figure 32:
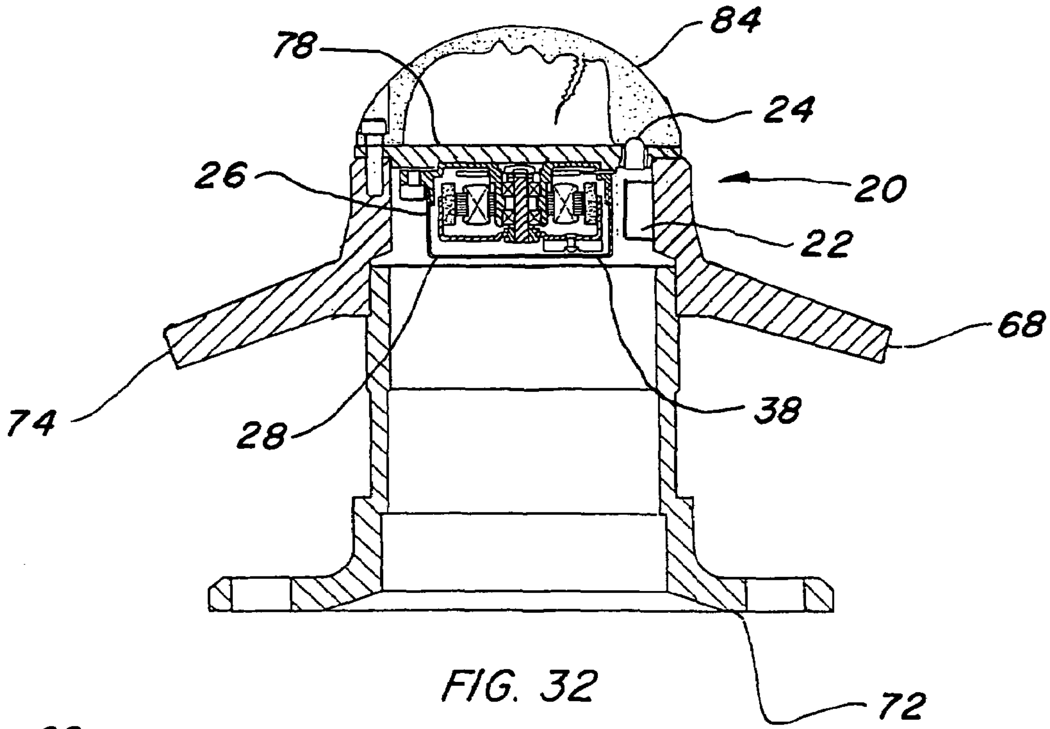
FIG. 32 is an arbitrary cross sectional view of the dual bar spinner knockoff and adapter enclosing the preferred embodiment of the invention.
Figure 33:
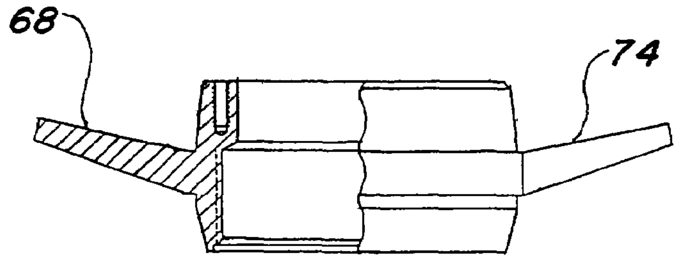
FIG. 33 is cut-away view of the side of the dual-bar spinner knockoff of the preferred embodiment.
Figure 34:
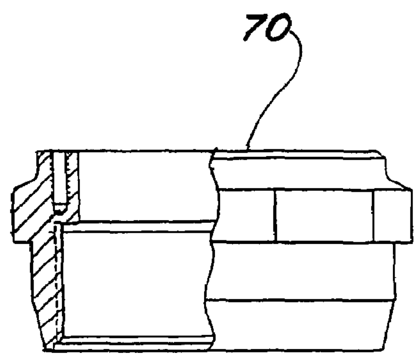
FIG. 34 is cut away view of the side of the hex nut spinner of the preferred embodiment.
Figure 35:
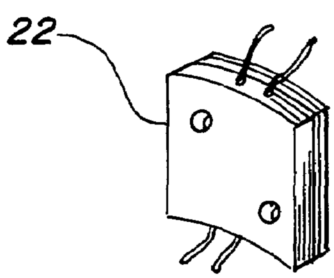
FIG. 35 is an isometric view of the rectifier utilized in conjunction with the permanent magnet generator in the preferred embodiment, shown by itself for clarity.
Figure 36:
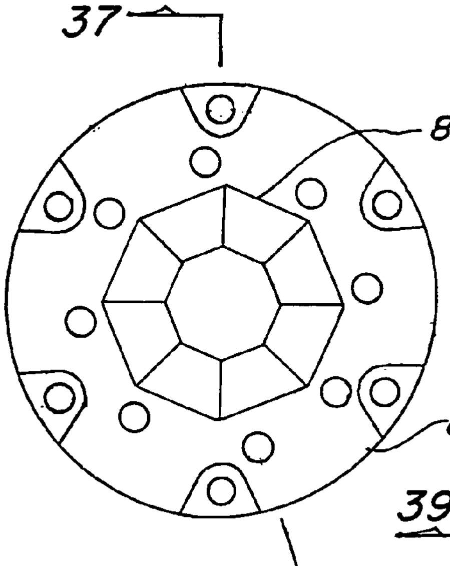
FIG. 36 is a plan view of the LED cap of the permanent magnet generator in the preferred embodiment having a chrome plated diamond internal shape, shown by itself for clarity.
Figure 37:
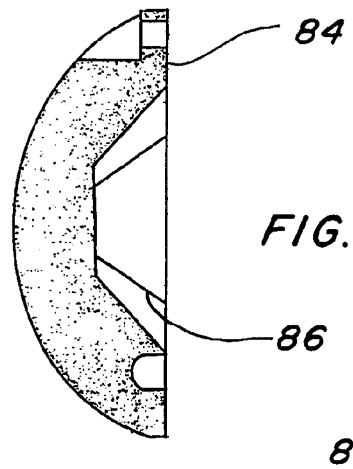
FIG. 37 is a cross sectional view taken along lines 37—37 of FIG. 36.
Figure 38:
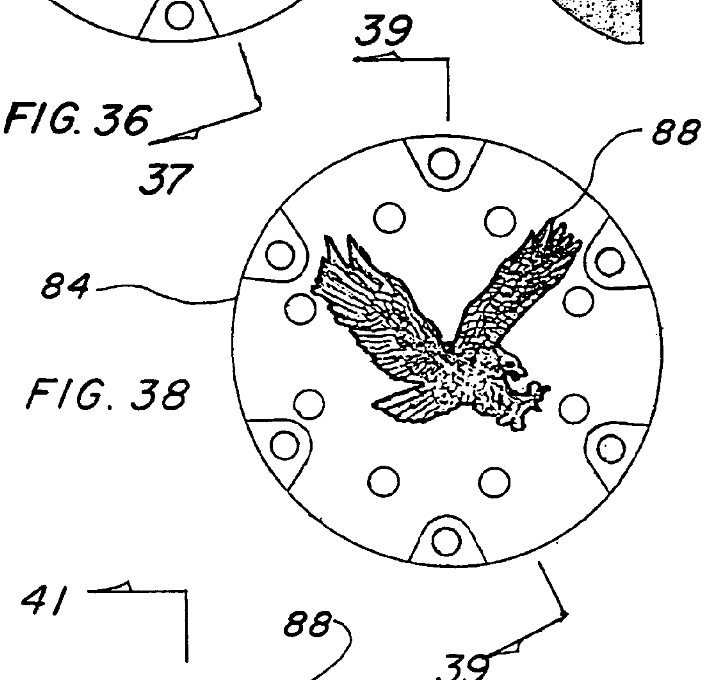
FIG. 38 is a plan view of the LED cap of the permanent magnet generator in the preferred embodiment having an eagle internal shape, shown by itself for clarity.
Figure 39:
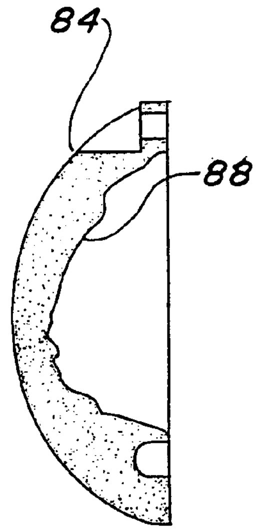
FIG. 39 is a cross sectional view taken along lines 39—39 of FIG. 38.
Figure 40:
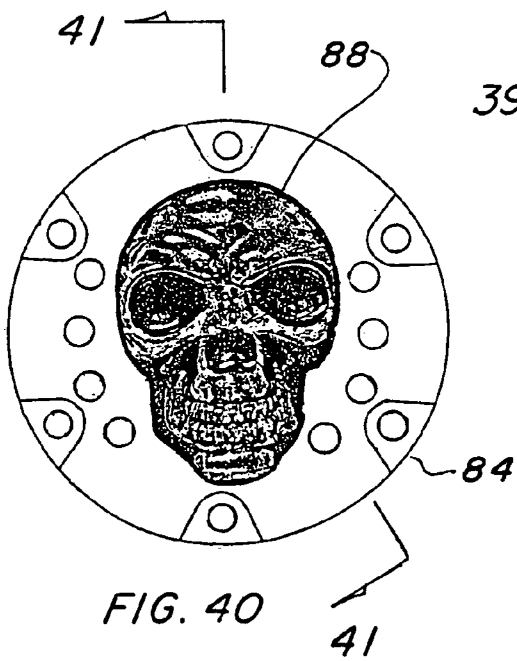
FIG. 40 is a plan view of the LED cap of the permanent magnet generator in the preferred embodiment having a skull internal shape, shown by itself for clarity.
Figure 41:
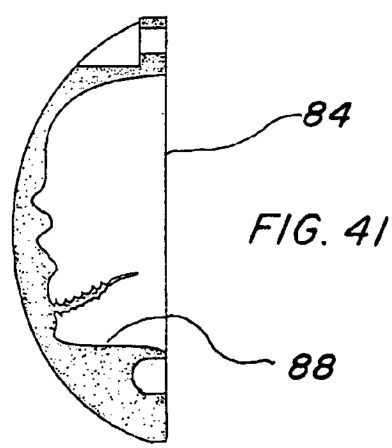
FIG. 41 is a cross sectional view taken along lines 41—41 of FIG. 40.

Revolving means for rotating the permanent magnet generator 20 to supply alternating current electrical power comprises a vehicle wheel 64, as illustrated in FIG. 1. In order to place the LEDs 24 in the wheel member 66, a spinner 68, a hex knock off 70 or a myriad of other hub cap arrangements including a center cap, a hub cap, a wheel cover, a wheel spoke or a spinner blade may be used, on trucks and automobiles. FIG. 31 illustrates a spinner adapter base 72, FIG. 33 shows a typical two bar knock off 74, FIG. 34 depicts a hex knock off 76, and FIG. 31 shows an assembly plate 78. The generator 30 is positioned within some type of base which is the same or similar to the adapter base 72, as illustrated in FIGS. 3 and 32.

With the generator 30 mounted in place in the base 72, the ac/dc bridge rectifier 22, which consists of a wheatstone bridge, is also mounted, in an optional location, within the same base and is in electrical communication with the generator 30. Power produced by the generator 30 is alternating current, as the poles within the magnet ring 60 determine the frequency relative to the speed of rotation. Since the rotating portion 26 of the generator 30 is revolved by the vehicle wheel 64, the rotational speed may vary. As an example, an average wheel rotating at a 5 MPH speed rotates approximately 78 RPM, and at 100 MPH the speed increases to approximately 1,530 RPM, which relates to a four pole generator producing a frequency of 2.5 HERTZ at 5 MPH and 50 HERTZ at 100 MPH. In order for the LEDs to operate, direct current is required; therefore the rectifier 22 is necessary. The rectifier 22 changes the alternating current from the generator 20 to a useable direct current for the LEDs.

In some cases with a multi-pole generator design, a voltage regulator 80 that is in electrical communication with the ac/dc bridge rectifier output may be required. Further, a current dropping resistor 82 may also be required in certain instances to limit the voltage to the LEDs 24.

Figure 3:
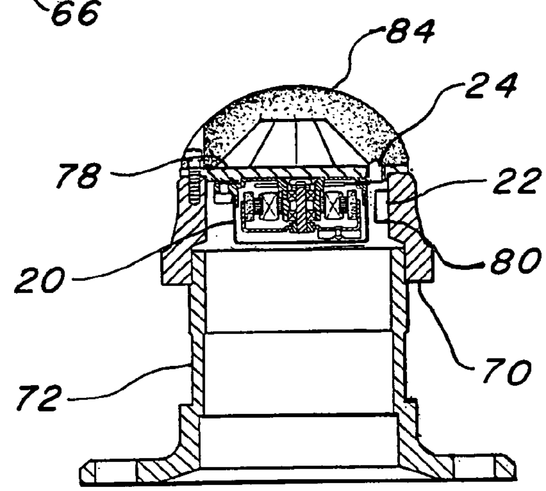
FIG. 3 is a cross sectional view taken along lines 3—3 of FIG. 2 showing the permanent magnet generator, LED's and rectifier installed in the wheel's hexagonal nut knockoff and adapter.
Figure 4:
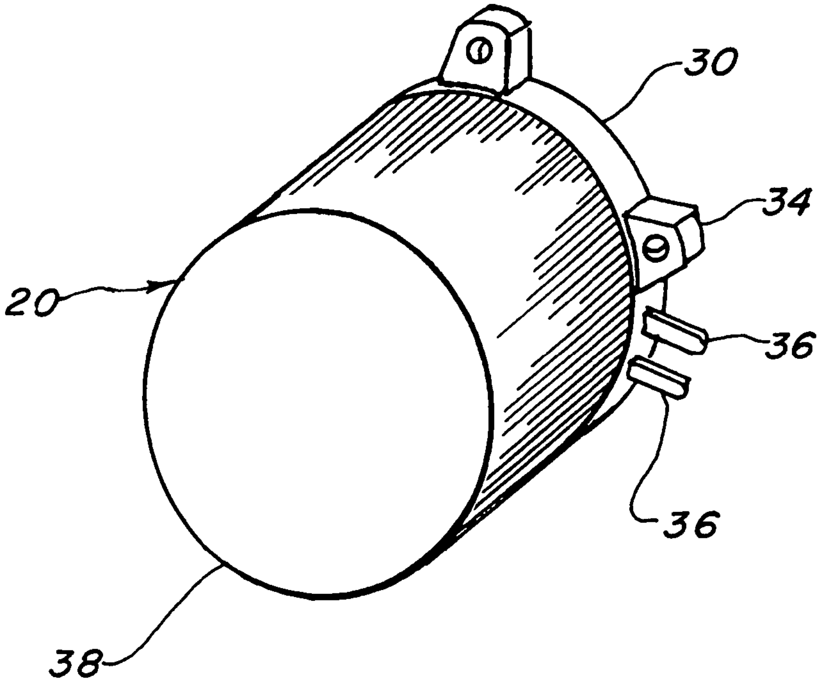
FIG. 4 is a partial isometric view of the permanent magnet generator in the preferred embodiment, shown by itself for clarity.

The plurality of LEDs 24 are preferably disposed within the assembly plate 78 that is attached to the adapter base 72, as illustrated in FIGS. 3 and 31. The LEDs 24 penetrate a transparent or translucent cap 84 that is attached to the base 72 or the LEDs 24 may be attached directly to the cap 84 as desired according to the particular design selected. The cap 84 may contain a wide variety of designs and ornamentation, as an example the transparent cap 84 may include a reflective coating 86 on a faceted inner surface with the LED's disposed in a geometrical array around the reflective coating. The cap 84 may also have an image 88 molded into the interior of the cap, such as the examples illustrated in FIGS. 36–41. Additionally, there is no limitation to the types of images, designs, indicia, symbols etc. that may be utilized.

Figure 42:
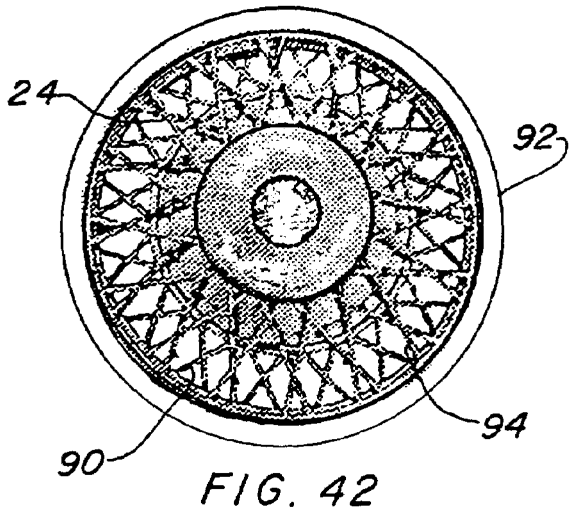
FIG. 42 is an elevation view of the light emitting diodes disposed onto a number of spokes on a wire spoke wheel surrounded by a transparent sleeve held in place with adhesive.
Figure 43:
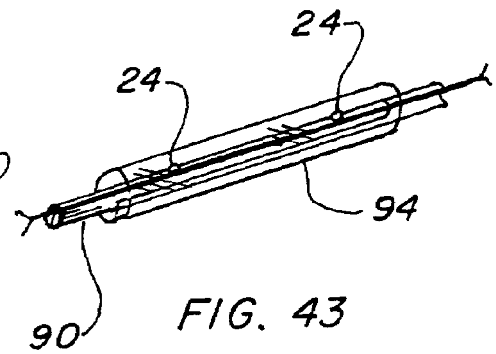
FIG. 43 is a fragmentary partial isometric view of light emitting diodes disposed onto a spoke on a wire spoke wheel surrounded by a transparent sleeve held in place with adhesive, with the sleeve shown partially wrapped around to illustrate the method of attachment.
Figure 44:
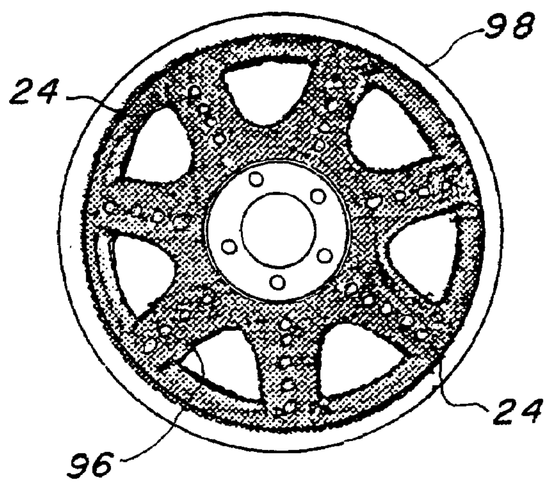
FIG. 44 is an elevation view of the diodes positioned within integral bars projecting radially from a wheel hub of an alloy wheel.
Figure 45:
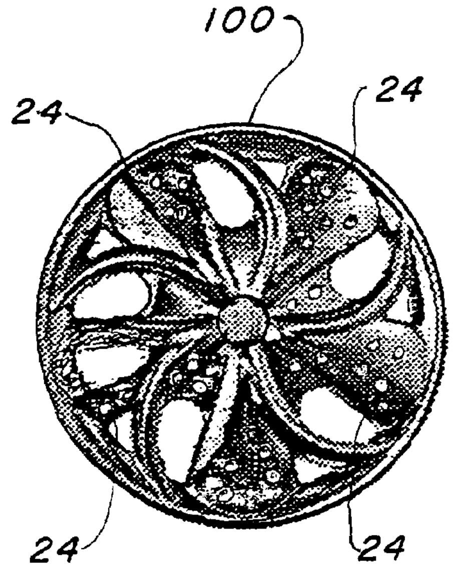
FIG. 45 is an elevation view of a wheel cover with the diodes inserted through the outside surface of the cover.
Figure 46:
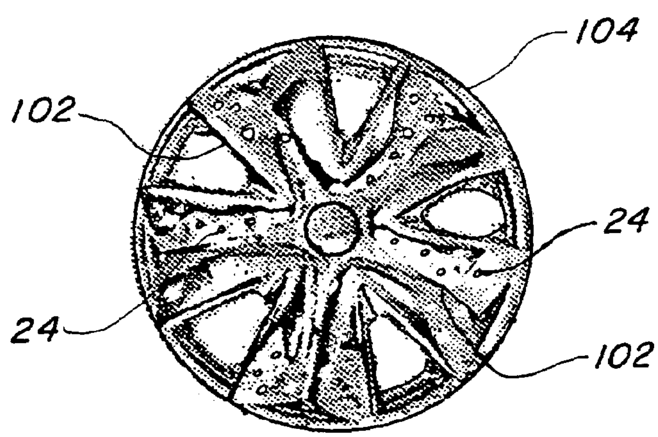
FIG. 46 is an elevation view of another variation of positioning the diodes on a wheel, wherein the diodes are positioned within the spinning blade of a wheel spinner cover.

The plurality of light emitting diodes 24 may also be disposed onto a plurality of spokes 90 on a wire spoke wheel 92 surrounded by a transparent sleeve 94 held in place with adhesive or the like, as illustrated in FIGS. 42 and 43. The diodes 24 may also be positioned within the integral bars 96 projecting radially from the wheel hub or center portion of an alloy wheel 98, depicted in FIG. 44, or through a wheel cover 100 as shown pictorially in FIG. 45. Another variation of positioning the diodes 24 on a wheel is illustrated in FIG. 46, wherein the diodes 24 are positioned within the spinning blade 102 of a wheel spinner cover 104.

In operation, the generator 20, rectifier 22 and LEDs 24 are mounted into the adapter base 72 with the cap 84 covering the LEDs 24 so as to permit visual indication from the outside. The base 72 is mounted on a vehicle wheel 64 in a conventional manner and the LEDs are static in the "at rest" position. When the vehicle starts and the wheels begin, to rotate the LEDs are energized by the generator 20 and continue to light as long as the wheel 64 is rotating. The visual appearance of the invention produces a ring or a number of rings according to the matrix or orientation of each LED 24. Further, stationary images may be viewed through the transparent cap 84. The LEDs 24 may be easily flashed on and off with the addition of well known solid state circuitry. Once the invention is attached to the vehicle's wheel no further maintenance, switching or replacing batteries is required.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A rotary motion powered light emitting diodes comprising:

a) a permanent magnet generator located within a vehicle wheel for producing electric power, b) revolving means for rotating the permanent magnet generator to supply alternating current electrical power, c) an ac/dc rectifier in electrical communication with the generator output that changes the alternating current produced by the permanent magnet generator to direct current, and d) a plurality of light emitting diodes disposed within a vehicle wheel member and powered by said direct current to produce an unusual and unique visual effect when the wheel is rotating, e) wherein said permanent magnet generator further comprises:

a rotating portion having:

a base including means for attaching the base to a vehicle wheel center, said base further having an inner surface and an outer surface, a case surrounding the outer surface of the base, a pair of axle bearings pressed into the base at spaced intervals, an axle cover positioned on the inner surface over the axle bearings, a plurality of armature laminations that are wound with armature coil windings and intimately engaging the base, and a stationary portion having:

an axle having a snap ring on one end pressed into the bearing races, a tightening ring intimately gripping the axle on an end opposite the snap ring, retaining the axle in-place between the bearings, a magnet ring frame interfacing with the tightening ring in a secure manner, and a magnet ring attached to the magnet ring frame, positioned over the armature laminations, having an air gap therebetween, wherein the magnet ring is magnetized with a plurality of opposed polarity poles that are placed at equal spaced intervals, said permanent magnet generator producing alternating current power when the rotating portion and stationary portion are in motion relative to each other.

2. The rotary motion powered light emitting diodes as recited in claim 1 wherein said permanent magnet generator further comprising a metallic construction material for said axle bearings, magnet ring and armature including coil windings, and thermoplastic for the remainder of the generator.

3. The rotary motion powered light emitting diodes as recited in claim 1 further comprising a counter weight affixed to said magnet ring frame on the generator's stationary side, thereby obtaining a differential rotation of the permanent magnet generator when a vehicle is turning a rotating portion of the generator.

4. The rotary motion powered light emitting diodes as recited in claim 1 further comprising a counter weight affixed to the generator's stationary side, thereby obtaining a differential rotation of the permanent magnet generator when a vehicle is turning a rotating portion of the generator.

5. The rotary motion powered light emitting diodes as recited in claim 1 wherein said revolving means for rotating the permanent magnet generator to supply alternating current electrical power further comprises a vehicle wheel.

6. The rotary motion powered light emitting diodes as recited in claim 1 wherein said wheel member is selected from the group consisting of a spinner, a knock off, center cap, a hub cap, a wheel cover, a wheel spoke and a spinner blade.

7. A rotary motion powered light emitting diodes comprising:

a) a permanent magnet generator located within a vehicle wheel for producing electric power, b) revolving means for rotating the permanent magnet generator to supply alternating current electrical power, c) an ac/dc rectifier in electrical communication with the generator output that changes the alternating current produced by the permanent magnet generator to direct current, wherein said ac/dc rectifier includes a wheatstone bridge, and d) a plurality of light emitting diodes disposed within a vehicle wheel member and powered by said direct current to produce an unusual and unique visual effect when the wheel is rotating.

8. The rotary motion powered light emitting diodes as recited in claim 1 further comprising a voltage regulator in electrical communication with the ac/dc bridge rectifier output.

9. The rotary motion powered light emitting diodes as recited in claim 1 further comprising a current dropping resistor in electrical communication with the ac/dc bridge rectifier output.

10. The rotary motion powered light emitting diodes as recited in claim 1 wherein said plurality of light emitting diodes are disposed within a transparent cap that is attached to a vehicle wheel.

11. The rotary motion powered light emitting diodes as recited in claim 1 wherein said plurality of light emitting diodes are disposed within a translucent cap attached to a vehicle wheel.

12. The rotary motion powered light emitting diodes as recited in claim 11 wherein said translucent cap further comprises a reflective coating on a faceted inner surface, with the light emitting diodes disposed in a geometrical array around the reflective coating.

13. The rotary motion powered light emitting diodes as recited in claim 1 wherein said plurality of light emitting diodes are disposed within a transparent cap, said cap having an image molded therein, with the cap attached to a vehicle wheel.

14. The rotary motion powered light emitting diodes as recited in claim 1 wherein said plurality of light emitting diodes are disposed within an assembly plate that is attached to a vehicle wheel with a cap engaging the plate.

15. The rotary motion powered light emitting diodes as recited in claim 1 wherein said plurality of light emitting diodes are disposed onto a plurality of spokes on a wire spoke wheel.

16. The rotary motion powered light emitting diodes as recited in claim 1 wherein said plurality of light emitting diodes are disposed within integral bars projecting radially from a wheel center portion of an alloy wheel.

17. The rotary motion powered light emitting diodes as recited in claim 1 wherein said plurality of light emitting diodes are disposed within a wheel cover.

18. The rotary motion powered light emitting diodes as recited in claim 1 wherein said plurality of light emitting diodes are disposed within a spinning blade of a wheel spinner cover.

19. A rotary motion powered light emitting diodes comprising:

a) a permanent magnet generator that is located within a vehicle wheel for producing electric power, and has a stationary side and a rotating side with a counter weight affixed to the generator's stationary side, thereby obtaining a differential rotation of the permanent magnet generator when a vehicle is turning the rotating portion of the generator, b) a rectifier in electrical communication with the generator output, thus altering the power produced by the generator to direct current, and c) a plurality of light emitting diodes disposed within a vehicle wheel and powered by said direct current to produce an unusual and unique visual effect when the vehicle is moving.

20. A rotary motion powered light emitting diodes comprising:

a) a permanent magnet generator for producing electric power having a counter weight affixed to a generator's stationary side, thereby obtaining a differential rotation of the permanent magnet generator when turning a rotating portion of the generator, b) means for producing direct current in electrical communication with the generator output altering the power produced by the generator, and c) a plurality of light emitting diodes powered by said direct current to produce a unique visual effect when rotated.

* * * * *